(12) United States Patent
Ogunnaike

(10) Patent No.: US 7,439,456 B2
(45) Date of Patent: Oct. 21, 2008

(54) TRAVEL BAG WEIGHING SYSTEM

(76) Inventor: Adedeji Oluwafisayo Ogunnaike, 48 Islip Manor Rd., Northolt (GB) UB5 5DZ ( * ) Notice: Subject to any disclaimer, the term of this patent is extended or adjusted under 35 U.S.C. 154(b) by 0 days.

(21) Appl. No.: 11/569,684

(22) PCT Filed: Jun. 2, 2005

(86) PCT No.: PCT/GB2005/002225

§ 371 (c)(1),
(2), (4) Date: Nov. 28, 2006

(87) PCT Pub. No.: WO2005/117636

PCT Pub. Date: Dec. 15, 2005

(65) Prior Publication Data

US 2007/0272449 A1    Nov. 29, 2007

(30) Foreign Application Priority Data

Jun. 2, 2004    (GB) ................................ 0412267.7

(51) Int. Cl.
G01G 19/58    (2006.01)
G01G 21/28    (2006.01)

(52) U.S. Cl. ...................................... 177/148; 177/245
(58) Field of Classification Search ................. 177/131, 177/148–149, 177, 245
See application file for complete search history.

(56) References Cited

U.S. PATENT DOCUMENTS

| | | | | |
|---|---|---|---|---|
| 3,655,003 A | * | 4/1972 | Yamajima | 177/173 |
| 4,650,014 A | * | 3/1987 | Oldendorf et al. | 177/177 |
| 5,167,289 A | * | 12/1992 | Stevenson | 177/141 |
| 5,844,474 A | * | 12/1998 | Saling et al. | 340/440 |
| 6,431,418 B1 | | 8/2002 | Pease | |
| 7,084,357 B2 | * | 8/2006 | Roberts et al. | 177/131 |
| 7,151,231 B2 | * | 12/2006 | Kamakau | 177/126 |
| 7,161,097 B1 | * | 1/2007 | Gorgone | 177/126 |
| 7,256,358 B2 | * | 8/2007 | Kesselman | 177/177 |
| 7,265,302 B2 | * | 9/2007 | Keech et al. | 177/131 |
| 7,281,615 B2 | * | 10/2007 | Siwak et al. | 190/39 |

(Continued)

FOREIGN PATENT DOCUMENTS

GB    2385142 A    8/2003

(Continued)

*Primary Examiner*—Randy W Gibson
(74) *Attorney, Agent, or Firm*—David A. Guerra (57) ABSTRACT

A weighing system for a travel baa for measuring and indicating the weight of the bag and/or its contents. The travel bag weigh system has two or three weight sensors and means to add together the weights sensed by them, and a single substantially rigid platform borne by the said weight sensors. The travel bag weighing system is built into the bag internally or externally, or being adapted to be placed into an existing said bag. The weight sensors project from the bag, measure and indicates its weight when empty and simultaneously indicates a normal maximum weight set by airlines. The system has a control and indicating digital unit located and/or visible outside the bag. The digital unit has a line of control means and a line of indicators, in differently coloured groups, which light up progressively towards the maximum weight, which can be preset or user-set and has a vocal indicator. The travel bag weighing system may also contain a measuring part internal of the bag and the bag tapers upwardly.

19 Claims, 6 Drawing Sheets

U.S. PATENT DOCUMENTS

| | | | |
|---|---|---|---|
| 7,282,653 B2 * | 10/2007 | Marks | 177/126 |
| 2005/0217904 A1 * | 10/2005 | Hughes | 177/245 |
| 2007/0007048 A1 * | 1/2007 | Gill | 177/131 |
| 2007/0107947 A1 * | 5/2007 | Truong | 177/131 |
| 2007/0209843 A1 * | 9/2007 | Hannon | 177/25.13 |

FOREIGN PATENT DOCUMENTS

| | | |
|---|---|---|
| WO | 84/04027 A | 10/1987 |
| WO | 03/100360 A | 12/2003 |

* cited by examiner

TRAVEL BAG WEIGHING SYSTEM

CROSS-REFERENCE TO RELATED APPLICATIONS

This application is an U.S. national phase application under 35 U.S.C. §371 based upon co-pending International Application No. PCT/GB2005/002225 filed on Jun. 2, 2005. Additionally, this U.S. national phase application claims the benefit of priority of co-pending International Application No. PCT/GB2005/002225 filed on Jun. 2, 2005 and Great Britain Application No. 0412267.7 filed on Jun. 2, 2004. The entire disclosures of the prior applications are incorporated herein by reference. The international application was published on Dec. 15, 2005 under Publication No. WO 2005/117636 A1.

FIELD OF THE INVENTION

This invention relates to travel bags, which term includes for example suitcases.

BACKGROUND

A difficulty arises in the travel industry, particularly in connection with air travel, in that passengers often have no more than a vague idea as to the actual weight of a travel bag when they go to check in at e.g. an airport. If they try to weigh their bags at home, this is often difficult and awkward. Added to this, there is often a maximum weight which is permitted, or is permitted without an "excess weight baggage" charge. This is usually the same for most carriers for journeys of a particular class, e.g. all flights abroad. Weighing bags at a check-in and dealing with excess weight baggage substantially increases the workload of staff, and eventually the cost of flights.

THE INVENTION

The inventor has appreciated that the above problems can be ameliorated by providing the intending passenger with convenient means to weigh a travel bag.

According to one aspect of the invention, there are provided weighing means adapted to combine with a travel bag to measure and indicate the weight of the bag and/or its contents. The term "bag" includes for example a suitcase, and may include the weight of auxiliary parts, e.g. a wheel unit attachable to the bag. Such means will usually comprise a weight-measuring part and a control/indicating unit. The term "bag" has reference to the bag (1) with or (2) without the weighing means, according as the case will allow, e.g. "a travel bag comprising weighing means" is a case of (1), while "weighing means adapted to combine with a travel bag" is a case of (2).

The weighing means preferably comprise at least two (more preferably three) weight sensors and means to add together the weights sensed by them. Preferably, there is used a single substantially rigid platform borne by the said weight sensors, as opposed to, for example, a multi-part platform with the parts flexibly joined together, e.g. one part for each sensor. Preferably, the weight sensors are adapted to be shock resistant. These various preferred features facilitate design of a simplified robust mechanism for weighing.

The weighing means may be built into the bag, e.g. externally or internally. The weighing means may comprise weight sensors and be adapted for these to project from the bag, e.g. out of the bag through gaps when the weighing means are internal of the bag (the weighing means being then so adapted, for example, by having fixing means to connect them internally to the base of the bag that are shorter than the sensors), in which case the weight sensors are preferably shaped to reduce the likelihood of a damaging sideways knock (e.g. the weight sensors having a conical profile of semi-vertical angle greater than 45 degrees), which further improves robustness of the mechanism.

In a particularly useful embodiment, the weighing means are adapted to be placed into an existing said bag. This does not preclude, in this embodiment, an indicator/control unit and/or sensors from being at least partially external to the bag; the weight-measuring part of said means is substantially wholly within the bag.

A particularly useful feature is for the weighing means to be adapted to measure the weight of the bag when empty.

In the present context, an important feature is for the weighing means to be adapted to indicate a normal maximum weight. The term "normal" is used because the weighing means may be capable of weighing and/or indicating weights higher than the normal maximum, e.g. if the passenger is prepared to pay for excess baggage weight. It is then very useful for the weighing means to be adapted to enable said normal maximum weight to be set (e.g. by the user, e.g. according to information published by a travel agent or an airline) and/or pre-set (e.g. by the manufacturer of the weighing means, more especially if there is a widespread, or universal, maximum weight for free baggage).

Another important feature in the present context is for the weighing means to be adapted to measure, or enable the setting and/or pre-setting of, the weight of the bag and to add this to the measured weight of its contents. The weighing means may be adapted to weigh the bag empty, or (if sold with, or for, a particular travel bag) the manufacturer for example may (possibly measure and) pre-set the weight of the bag, or may indicate this to the user for the user to set it.

In most embodiments, the weighing means comprise a control and indicating unit. This is preferably adapted to be located and/or visible outside the bag, e.g. on the free end of a cable leading from a measuring part of said means. This unit may, during packing of the travel bag, conveniently be hung outside the bag suspended from its cable. In any case, said unit may comprise an analogue indicator display, which may be digitised, and/or a digital indicator display. The latter preferably is adapted to display two rows of digits, one to indicate a normal maximum weight and the other to indicate the measured weight. Particularly for use in the dark, or in dim lighting conditions, said digital indicator display is adapted to be illuminated, and preferably comprises a liquid crystal display (LCD).

The following features make said unit more user-friendly, e.g. to make said unit suitable for deaf or blind people:
said unit comprises a line of control means and a line of indicators;
the two lines diverge from a common point and converge to a common point;
there is an audio indicator at one of said points and a visual indicator at the other said points;
the line of indicators comprises a progressive series of visual indicators progressing from indicating a low measured weight towards an indication of a normal maximum weight;
the progressive series comprises a line of lights, adapted to light up progressively from one end of the line as the measured weight increases;

the weighing means are adapted for the lights to light up adding lights lit up progressively along the line towards all the lights being lit up at said normal maximum weight;

the weighing means are adapted for the progression to start with a plurality of lights that light up green, followed by a plurality of lights that light up substantially amber (e.g. yellow, amber or orange), followed by a plurality of lights that light up red;

the weighing means comprise a vocal indicator of setting, e.g. for blind people;

the weighing means comprise a sound on/off control (e.g. a toggle button), e.g. for one or more audio indicators (or all of them), e.g. chosen among an indicator that a maximum weight has been reached, an indicator of the currently measured weight (with or without an addition, e.g. the weight of the bag alone) and/or a weight-setting indicator (e.g. giving the current weight-setting when setting a normal maximum weight and/or when setting the weight of the bag alone.

According to another aspect of the invention, there are provided weight-measuring means adapted to be a weight-measuring part of any such weighing means and to be connected to a weight-indicating and/or control unit thereof. According to another aspect of invention, there is provided a weight-indicating and/or control unit adapted to be part of these such weighing means and to be connected to a weight-measuring part thereof. Such weight-measuring means and/or such unit may be sold alone. Again, they may be sold together but as a kit of parts. Said unit may be adapted to indicate a normal maximum weight, possibly to be set or pre-set to indicate a normal maximum weight, possibly to indicate when an increasing weight being measured reaches a normal maximum weight, e.g. a set or pre-set weight.

According to another aspect of the invention, there is provided a control and indicating unit, e.g. adapted for use with weighing means, which unit comprises a line of control means and a line of indicators, which two lines diverge from a common point and converge to a common point.

Although the weighing means may be sold separately for installation in an existing travel bag, more usually there will be sold, according to another aspect of the invention, a travel bag comprising weighing means adapted to measure and indicate the weight of the bag and/or its contents. The weighing means may then be any such as described above. In a particularly useful embodiment of such a travel bag, said weighing means comprise a measuring part internal of the bag and the bag tapers upwardly, i.e. is of decreasing cross-section upwards. This serves to facilitate weighing the contents within the bag, since they are then not supported by the sides of the bag, assuming they are not packed so tightly as to give a falsely high weight indication.

According to another aspect of the invention, there is provided a method of weighing a travel bag and/or its contents, in which there are used any such weighing means. Preferably, there is provided an indication of a normal maximum weight. Preferably, there is provided an indication when the weight being measured reaches a normal maximum weight. Preferably, the weight of the bag is set or pre-set into said weighing means, usually to be added by the weighing means to the weight of the bag's contents. In a preferred method embodiment, the weighing means are used to weigh the bag empty, first.

Due to the increased travel difficulties arising from such causes as, for example, the EU expansion, the new London Heathrow, Terminal 5, extension, similar changes in other countries, and increases in world travel, the following advantages of embodiments of the invention are particularly appropriate. They can:

substantially reduce the check-in times at the airport reduce costs of manning the airport check-in desks save passengers paying unexpected and embarrassing excess fuss aid in complying with the new BAA (British Airports Authority) baggage weight allowance of 32 kg intended to protect baggage handlers (and corresponding regulations in other countries)

reduce stress and worry for passengers assist people with disabilities, e.g the blind or deaf, in putting together (packing) their luggage assist people who are not physically strong, e.g. women, children, disabled, to obtain an approximate weight so that they will not needlessly have to carry heavy bags to obtain their weight.

will free considerable airline personnel time in checking baggage weights, and thus allow staff to concentrate on important issues like security checks, which have now become very important.

DESCRIPTION OF THE DRAWINGS

Reference will now be made by way of example to the accompanying drawings, in which.

Referring to the drawings, weighing means 10 (FIGS. 1, 2 and 5) are adapted to combine with a travel bag 12 to measure and indicate the weight of the bag 12 and/or its contents 14. Such means 10 comprise a weight-measuring part 16 and a control/indicating unit 18 (which may be the unit 36 shown in more detail in FIG. 9). Bag 12 has the usual handle 19 and zip fastener 23.

Figure 1:
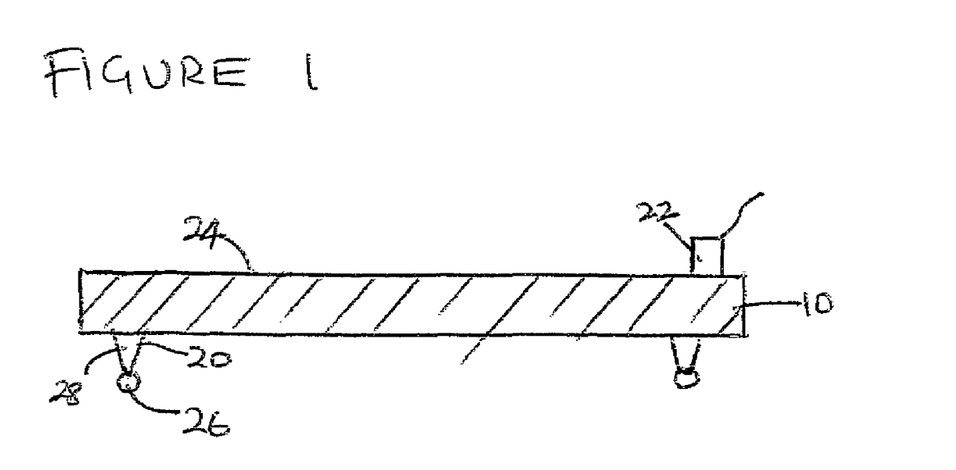
FIG. 1 is a side view, viewed in the direction of arrow 1 in FIG. 2, of weighing means embodying the invention.
Figure 2:
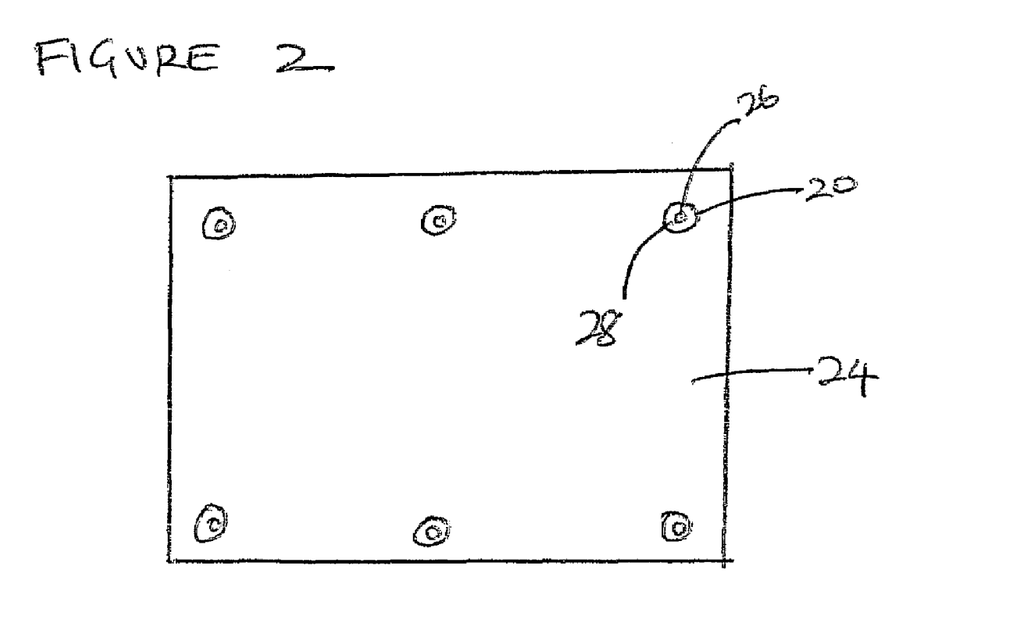
FIG. 2 is an underneath plan view of the same, viewed in the direction of arrow 2 in FIG. 1.
Figure 3:
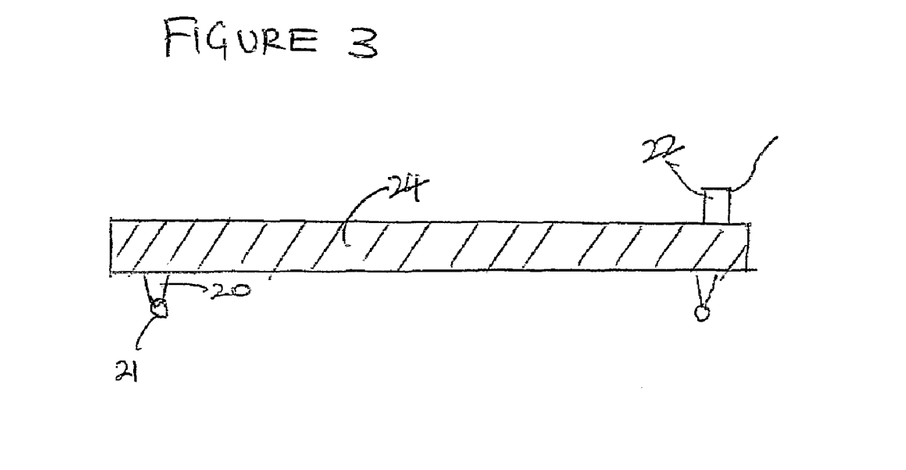
FIGS. 3 and 4 are views corresponding to FIGS. 1 and 2 of another embodiment.
Figure 4:
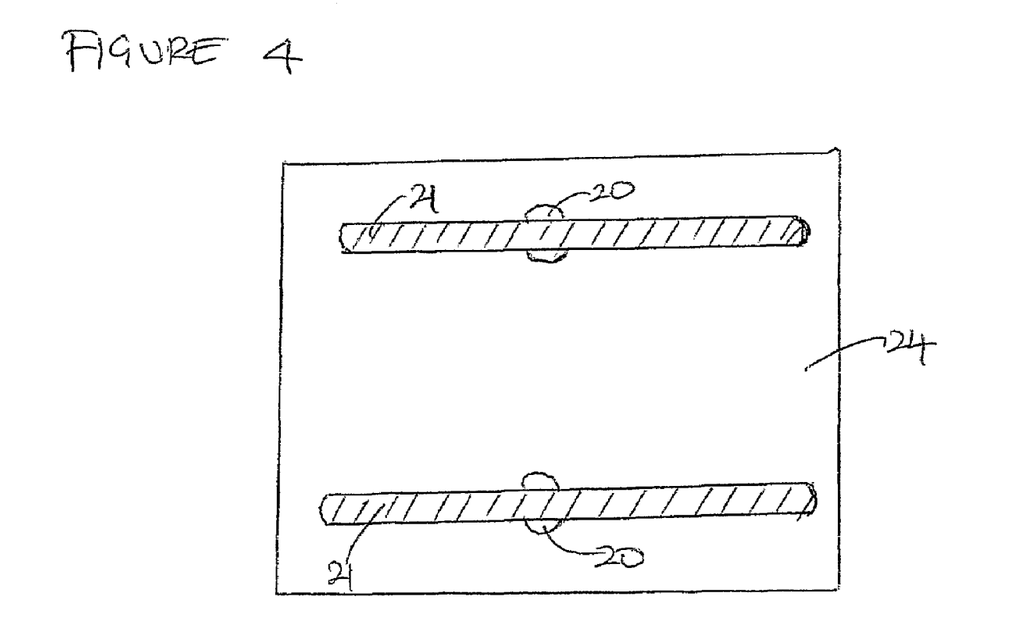
Figure 10:
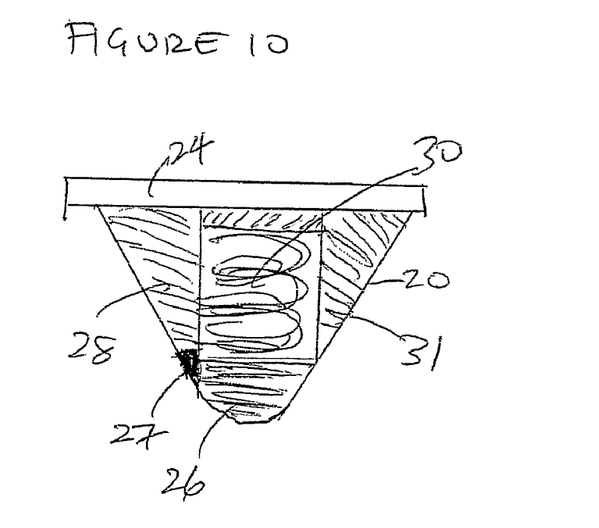
FIGS. 10 and 11 are vertical cross-sections of sensors for use in all of the embodiments of FIGS. 1 to 8.
Figure 11:
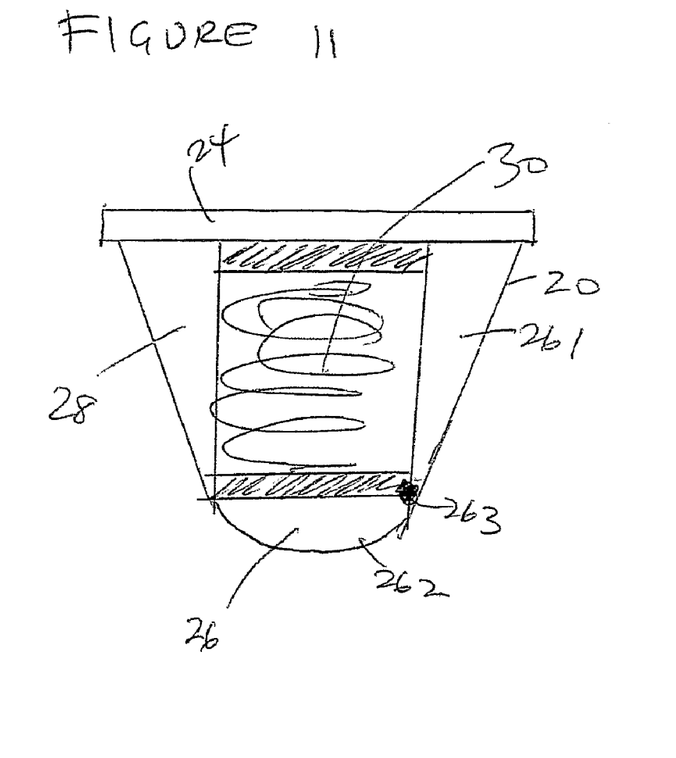

Part 16 comprises six weight sensors 20 and means 22 to add together the weights sensed by them. It further comprises a substantially rigid platform 24 borne by the said weight sensors 20. These are adapted to be shock-resistant by virtue of the following. Each sensor 20, FIG. 10, comprises a cylindrical central probe 26 that reciprocates (vertically, as seen in FIGS. 10 and 11) within a rigid protective casing 28, against a spring 30. The position of probe 26 may be measured by position detector 31, and this is used to measure the weight sensed by the probe 26 according to how far the sensed weight causes probe 26 to be pushed into casing 28 against spring 30. Alternatively, FIG. 11, the probe 26 comprises upper and lower portions 261 and 262 respectively, separated by a piezo-electric transducer 263 to measure the load on probe 26. In either example, the maximum weight measurable occurs at the point when probe 26 just disappears into casing 28. At this point, spring 30 is still not yet wholly compressed, but any greater load (e.g. due to a shock loading, as might occur if bag 12 is dropped) that would have been on probe 26 is now transferred to the rigid casing 28, which thus acts as a shock-absorber. As an alternative, FIGS. 3 and 4, there are two horizontal rods 21, 21 bearing the platform 24, one either side of the platform 24, each constrained to reciprocate vertically (in the direction of arrow 4) relative to the platform 24, and each connected to the platform 24 through a single weight sensor 20. Compared with this alternative, the arrangement of FIGS. 1, 2 and 5 is considered capable of being much more stable and robust.

Figure 6:
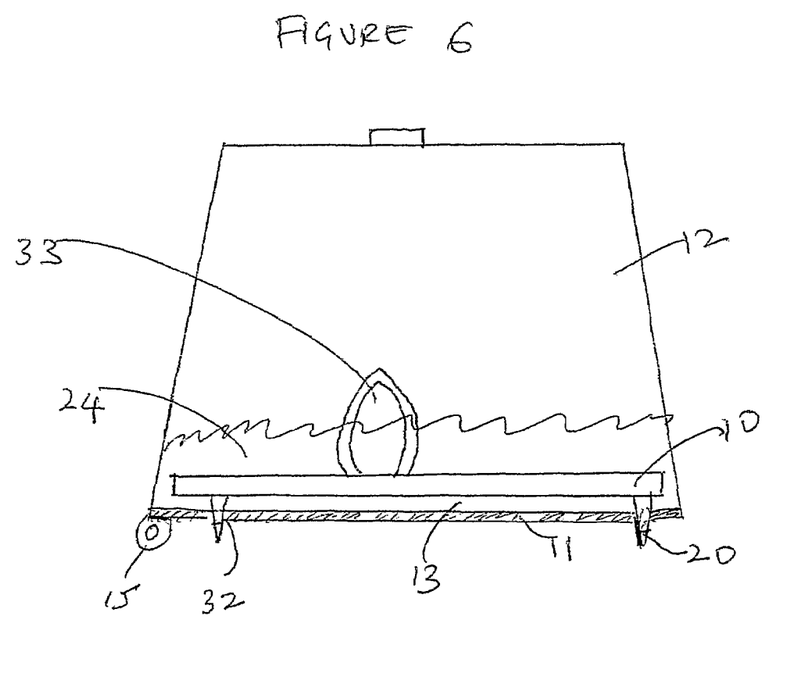
FIGS. 6 and 8 are views corresponding to FIG. 5 of two further embodiments.
Figure 7:
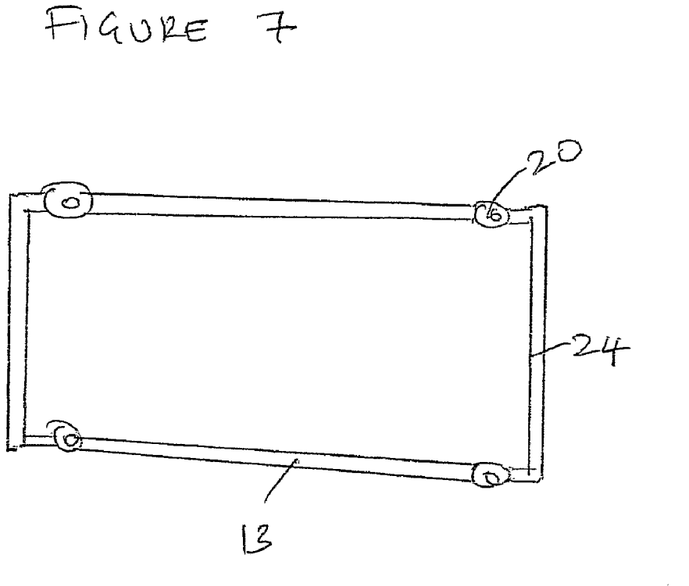
FIG. 7 is a view corresponding to FIG. 2 of weighing means for use in these two further embodiments.
Figure 8:
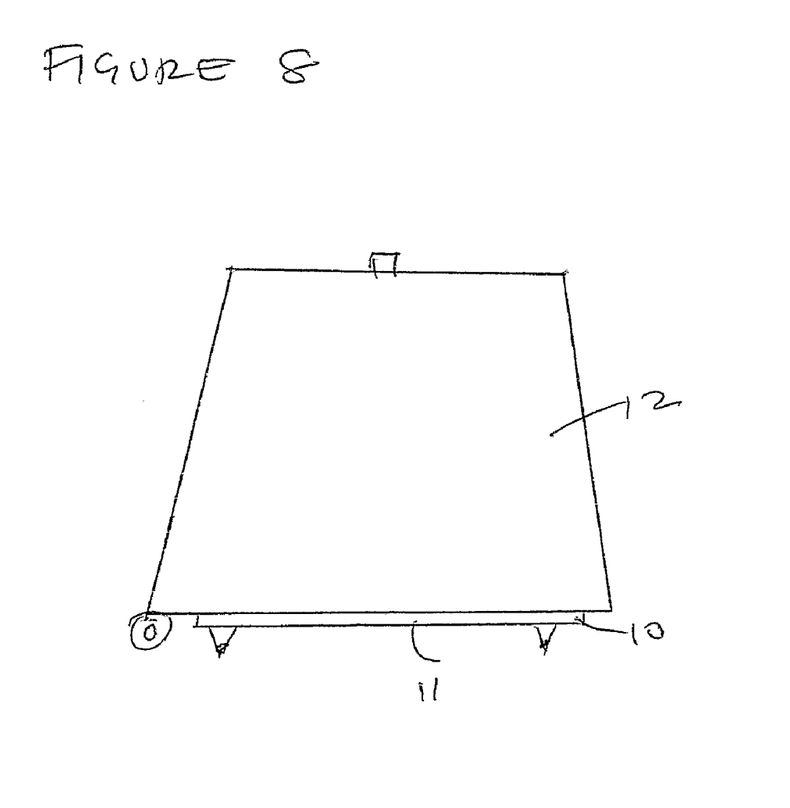

In the FIG. 8 example, weighing means 10 are built into the bag 12 externally. In the FIG. 6 example, weighing means 10 are built into the bag 12 internally and the weight sensors 20 project out of the bag 12 through gaps 32 in bag 12. Both of these examples have the advantage that the weight measured by the sensors 20 includes that of the bag and its contents. In both cases, since sensors 20 project outside bag 12, they are shaped to reduce the likelihood of a damaging sideways knock, by having a conical profile of semi-vertical angle 27, FIG. 10, greater than 45 degrees. In the arrangements of FIGS. 6 and 8, there is no need for platform 24 to support contents 14, and these can be supported directly on the base 11 of bag 12, platform 24 then being simplified into the form of a frame 24, seen more clearly in FIG. 7, which is preferably substantially rigid, and serves to locate and bear the sensors 20 suitably and connect them to the base 11, e.g. by means of connectors 13 (e.g. of nut-and-bolt type) connecting frame 24 to base 11.

Figure 5:
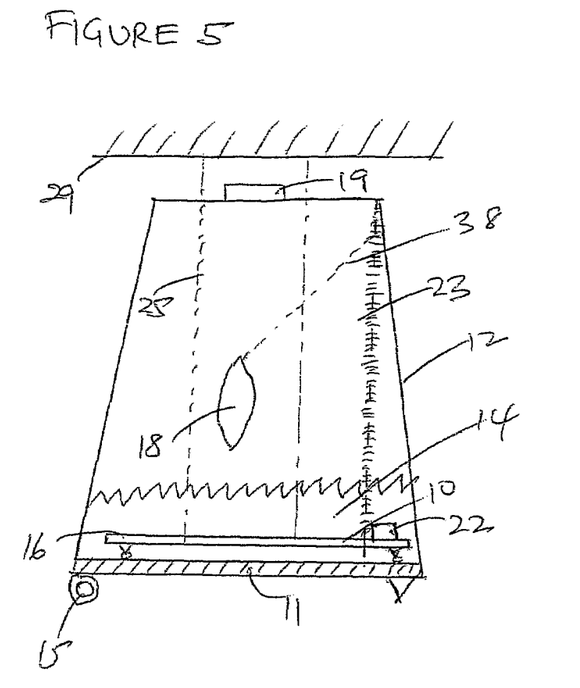
FIG. 5 is a partly cut away front view of the FIG. 2 embodiment, viewed in the direction of arrow 1 in FIG. 2.

In the FIG. 5 example, weighing means 10 have their sensors 20 resting on the base 11 of bag 12, and calculating means 22 are adapted to add the weight of bag 12 to the total measured weight (the sum of the weights measured on all the sensors 20) of the contents 14. The weight of bag 12 is set or pre-set into means 22; the measured weight of contents 14 is transmitted through wiring not shown from sensors 20 to calculating means 22.

In the arrangements of FIGS. 5 and 6, the weighing means 10 are adapted to be placed into an existing said bag 12, e.g. by being fitted to the shape and size of the floor of the bag 12 and/or by being light in weight, e.g. less than 1 kg, preferably less than 0.5 kg, so as to minimise the weight thereby added to the travel bag 12, while commensurate with sufficient strength, and if necessary rigidity, for weighing means 10 to measure the required weight. However, in these arrangements of FIGS. 5 and 6, the weighing means 10 may be built into the bag 12.

In the arrangements of each of FIGS. 6 and 8, the unit 18 and sensors 20 are at least partially external to the bag 12.

Figure 12:
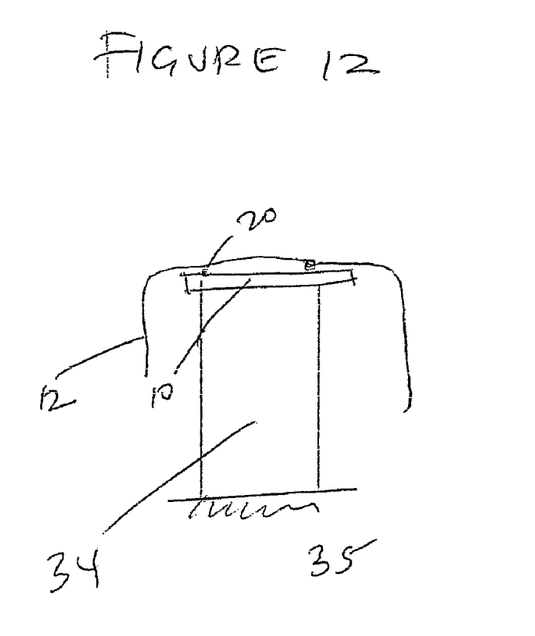
FIG. 12 is a schematic cross-section of an arrangement for measuring the weight of an empty bag embodying the invention.

When the sensors 20 are to be wholly within bag 12, which is the usual case when they rest on the floor of bag 12, FIG. 5, the weight of the bag 12 when empty may be programmed into means 22 by being set by the user or pre-set by the manufacturer, provided the bag 12 and its empty weight are known. If the bag is not known, e.g. upon purchase of the weighing means 12 as a separate item, or if its weight may vary after purchase, e.g. by addition of a separate wheel unit 15, weighing means 10 are preferably adapted to measure the weight of the bag 12 when empty. For this purpose, the empty bag 12 may simply be put onto weighing means 10 to weigh it, in which case the weight of the empty bag 12 and the (known) weight of weighing means 10 are programmed into means 22 as weights to be added to the measured weight of contents 14, or bag 12 (with weighing means 10 inside it) is inverted and placed on a support 34, FIG. 12, where it is supported solely by weighing means 10, which will then indicate the weight of the bag 12, apart from the (known) weight of weighing means 10. If necessary, the weight of weighing means 10 can be found by placing it on its own, with its sensors 20 downwards, on floor 35. However, usually, the weight of weighing means 10 will be part of the total weight measured by sensors 20. (The weight of probes 26, or portions 262, if not included in one of the measured weights, can be ignored.)

Weighing means 10 are adapted to indicate a normal maximum weight, which is usually 34 kg. This can be pre-set by the manufacturer, e.g. as a default value that can be temporarily re-set by the user. In practice, weighing means 10 are adapted to measure the weight of the bag 12, or enable the setting and/or pre-setting of this weight, in means 22, and are adapted to add this in means 22 to the measured weight of contents 14. For this purpose, the weighing means 10 comprise a control and indicating unit 36 adapted to be located and/or visible outside the bag, e.g. on the free end of a cable 38 leading from a measuring part 16 of said weighing means 10, which unit 36 may, during packing, conveniently be hung outside the bag 12 suspended from its cable 38 by the user.

Figure 9:
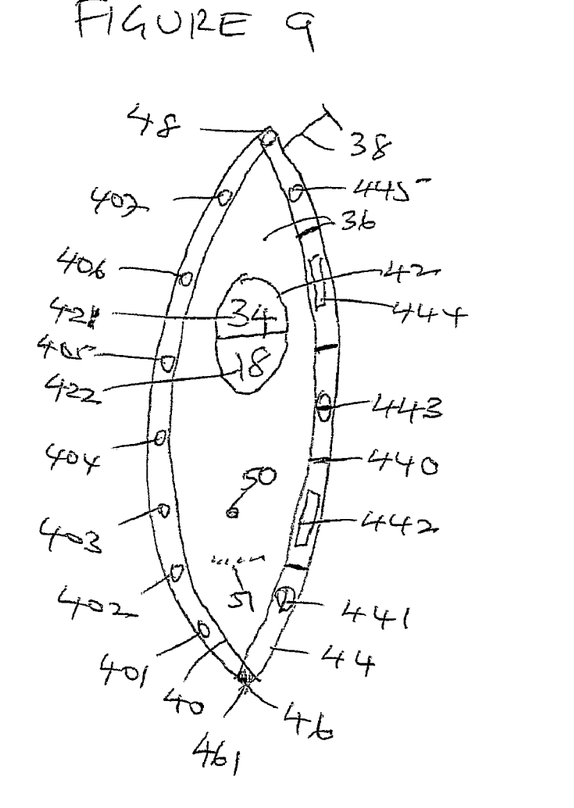
FIG. 9 is a front view of a control and indicator unit for use in all of the embodiments of FIGS. 1 to 8.

The unit 36 comprises an analogue indicator display 40 which is digitised as explained below. The unit 36 also comprises a digital indicator display 42 which adapted to display two rows 421, 422 of digits, row 421 to indicate a normal maximum weight and row 422 to indicate the measured weight (actually the total weight as an output from calculating means 22). Display 42 comprises a liquid crystal display (LCD) and is adapted to be illuminated by being back-lighted.

The unit 36 comprises a line 44 of control means and a line 40 of indicators. The two lines 40, 44 diverge from a common point 46 and converge to a common point 48. There is an audio indicator 461 at one of said points and a visual indicator 481 at the other said points. The line 40 of indicators comprises a progressive series of indicators 401 to 407, visual indicators for normal people and deaf people, or inflatable blisters for blind people, progressing from indicating a low measured weight (when only indicator of 401 is actuated) towards an indication of a normal maximum weight (when all of indicators 401 to 407 are actuated). Thus, for example for sighted people, the progressive series comprises a line of lights, LEDs 401 to 407, adapted to light up progressively from one end of the line 40 as the measured weight increases, more particularly adapted for the lights 401 to 407 to light up adding lights lit up progressively along the line 40 towards all the lights being lit up at said normal maximum weight, even more particularly adapted for the progression to start with a plurality of lights 401, 402, 403 that light up green, followed by a plurality of lights 404, 405 that light up substantially amber, e.g. yellow, amber or orange, followed by a plurality of lights 406, 407 that light up red. Light 407 is much brighter than the others because it has to indicate that the normal maximum weight has been reached.

The line 44 comprises control means 441 to 445, separated by raised portions 440. Control means 441 is used to decrease, and control means 445 is used to increase, a weight setting, e.g. the normal maximum weight setting that appears on display 421, in units of 0.5 kg or 1 lb. Control means 442 comprises a push-button 442 which is pressed repeatedly to cycle through successive modes, e.g. to set the normal maximum weight that appears on display 421, or to set the empty weight of bag 12. Control means 443 is a power on-off button. Control means 444 switches the displays on display means 42 from lb to kg and vice versa. The weighing means 10 comprise a vocal indicator 461, actuated by actuation of each of control means 441 to 445, to give a vocal indication of the setting thereof for blind people. The unit 36 also comprises a sound on/off control button 50, effective to switch off all of the audio indicator functions, which include: an indicator that a maximum weight has been reached, an indicator of the currently measured weight (with or without an addition, e.g. the weight of the bag alone) and/or a weight-setting indicator (e.g. giving the current weight-setting when setting a normal maximum weight and/or when setting the weight of the bag alone. Controls 50, and 441 to 445, all have a Braille marking 51 for blind people. Audio indicator 461 normally provides a vocal signal for each indication but provides a special audio signal (a loud prolonged beep) to indicate that the normal maximum weight has been reached.

When travel bag 12 comprises weighing means 10 comprising a measuring part 16 wholly internal of the bag 12, the bag 12 (FIG. 5) tapers upwardly.

It will be seen that there has been provided a method of weighing a travel bag and/or its contents, in which there are used weighing means 10. In this method, there is provided an indication of a normal maximum weight, and an indication when the weight being measured reaches a normal maximum weight. Further, the method can include steps in which the weight of the bag is set or pre-set into said weighing means, usually to be added by the weighing means 10 to the weight of the bag's contents. In one example, the weighing means are used to weigh the bag empty.

With all of the embodiments, the bag 12 to be weighed should be placed on a substantially level floor 35 or other surface and, if appropriate, may be provided with one or more supports 17 to ensure that base 11 is substantially level. This applies equally to the set of sensors 20 if they are to stand on the floor 35.

In one embodiment of a method of setting up weighing means 10, the weight of the bag 12, e.g. plus that of the weighing means 10, is programmed into the weighing means 10 to be added to the weight of the bag's contents 14, e.g. for internal weighing means 10.

The bag 12 plus internal weighing means 10 can be turned upside down and the weighing means 10 rested upon a support 25, usually resting on the floor 29, to give the tare weight.

The bag 12 plus the attached (internal) weighing means 10 can be suspended from the weighing platform 24 of the weighing means 10 (e.g. by suspending them by ring 33, likewise fitted in FIG. 5, assuming platform 24 is connected to the rest of weighing means 10 and bag 12 via sensors 20) to give a negative weight, or to give a tare-zero, e.g. automatically (setting the tare to zero) when a stable negative weight is detected, e.g. as by supporting the combination from ring 33 attached to the platform 24.

The unit 18 may be wired to the rest of the weighing means 10, e.g. plugged thereinto, or it may have a non-wired (e.g. radio or infra-red link) remote signalling connection thereto. When separated from the bag 12 and the rest of weighing means 10, unit 18 may be put in the pocket for the duration of the journey, and/or may function as a clock, e.g. an alarm clock, a calculator, an electronic games device, a video, CD or like player, a temperature or other weather, ambient and/or atmospheric conditions detector and/or indicator, and/or a radio or television device, e.g. receiver. Unit 18 may have a battery, rechargeable (e.g. via an included or associated international adaptor to plug unit 18 into a wall anywhere) when unit 18 is unplugged from weighing means 18, and able to power (or recharge a separate battery of) the rest of weighing means 10 when plugged back thereinto.

It will be apparent to one skilled in the art, that features of the different embodiments disclosed herein may be omitted, selected, combined or exchanged and the invention is considered to extend to any new and inventive combination thus formed. Where a preference or particularisation is stated, there is implied the possibility of its negative, i.e. a case in which that preference or particularisation is absent.

Many variations of the invention and embodiments hereinbefore described will be apparent to people skilled in the art and all such variations are to be considered as falling within the scope of the invention.

The invention claimed is:

1. A weighing system for a travel bag, said weighing system comprising:
   a platform adjacent a base section of a bag;
   at least two weight sensors attachable to said platform;
   a calculating means attachable to said platform and in electrical communication with said weight sensors; and
   at least one control unit in communication with said calculating means and visible outside said bag, said control unit having a display and an alerting means, said control unit is preset with a predetermined weight which is measured against a weight signal from said calculating means, said alerting means being activated when said calculated weight signal equals said preset weight.

2. The weighing system as set forth in claim 1, wherein said control unit is removably wired to said calculating means.

3. The weighing system as set forth in claim 1, wherein said control unit is in wireless communication with said calculating means.

4. The weighing system as set forth in claim 3, wherein said control unit further comprising a component selected from the group consisting of a clock, an alarm clock, a calculator, an electronic gaming device, a video device, a compact disc player, a temperature detector, an ambient weather condition detector, an atmospheric weather condition detector, a radio receiver, and a television receiver.

5. The weighing system as set forth in claim 3, wherein said control unit further comprising a rechargeable battery and a recharging means, wherein said control unit is adapted to charge a rechargeable battery of said weighing system when said control unit is plugged into said weighing system.

6. The weighing system as set forth in claim 1, wherein each of said weight sensors further comprising a casing, a cylindrical central probe adapted to reciprocate within said casing, a spring acting against said probe, and a sensor in communication with said calculating means.

7. The weighing system as set forth in claim 6, wherein each of said weight sensors further comprising a rod attachable to said probe and constrained to reciprocate vertically relative to said platform.

8. The weighing system as set forth in claim 6, wherein said sensor is a position sensor adapted to measure the position of said probe.

9. The weighing system as set forth in claim 6, wherein said sensor is a pieso-electric transducer adapted to measure load on said probe.

10. The weighing system as set forth in claim 1, wherein said weight sensors being in contact with said base of said bag.

11. The weighing system as set forth in claim 1, wherein said weight sensors being in contact with a surface supporting said bag.

12. The weighing system as set forth in claim 1, wherein said platform being adapted to support said base of said bag.

13. The weighing system as set forth in claim 1, wherein said platform being adapted to support the contents placed within said bag.

14. The weighing system as set forth in claim 1, wherein said alerting means of said control unit is an audio device.

15. A travel bag weighing system comprising:
- a substantially rigid platform adjacent a base section of a bag;
- at least two weight sensors attachable to said rigid platform, each of said weight sensors having a casing, a cylindrical central probe adapted to reciprocate within said casing, a spring acting against said probe, and a sensor;
- a calculating means attachable to said rigid platform and in electrical communication with each of said sensors of said weight sensors, said calculating means being adapted to calculate a weight signal from all of said weight sensors; and
- at least one control unit in wireless communication with said calculating means, said control unit having a display and an alerting means, said control unit is preset with a predetermined weight which is measured against said weight signal from said calculating means, said alerting means being activated when said weight signal equals said preset weight;
- wherein said alerting means is an audio device.

16. The weighing system as set forth in claim 15, wherein said display of said control unit only displays-only said weight signal from said calculating means without measuring it against said preset predetermined weight.

17. A travel bag weighing system comprising:
- a substantially rigid platform adjacent a base section of a bag;
- at least two weight sensors attachable to said rigid platform, each of said weight sensors having a casing, a cylindrical central probe adapted to reciprocate within said casing, a spring acting against said probe, and a sensor;
- a calculating means attachable to said rigid platform and in electrical communication with each of said sensors of said weight sensors, said calculating means being adapted to calculate a weight signal from all of said weight sensors;
- at least one control unit in communication with said calculating means, said control unit having a display and an audio alerting means, said control unit is preset with a predetermined weight which is measured against said weight signal from said calculating means, said audio alerting means being activated when said weight signal equals said preset weight; and
- a series of visual indicators for progressively indicating the weight calculated from said calculating means, wherein said visual indicators progress from indicating a low measured weight towards an indication of a normal maximum weight;
- wherein said control unit is a line of control means and said series of visual indicators is a line of indicators, said lines diverge from a common point and converge to a common point opposite said diverging common point, wherein one of said common points comprises said audio alerting means and said other common point comprises a visual indicator.

18. The weighing system as set forth in claim 17, wherein said line of series of visual indicators being a plurality of lights that light up green, followed by a plurality of lights that light up amber, followed by a plurality of lights that light up red.

19. The weighing system as set forth in claim 17, wherein said display being positionable in the space between said line of control means and said line of series of indicators, said display having a first display for displaying said predetermined weight and a second display for displaying said weight signal.

* * * * *